United States Patent
Jackson et al.

(10) Patent No.: US 6,575,702 B2
(45) Date of Patent: Jun. 10, 2003

(54) AIRFOILS WITH IMPROVED STRENGTH AND MANUFACTURE AND REPAIR THEREOF

(75) Inventors: Melvin Robert Jackson, Niskayuna, NY (US); Aaron Todd Frost, Ballston Spa, NY (US); Shyh-Chin Huang, Latham, NY (US); Charles Gitah Mukira, Clifton Park, NY (US); Thomas Robert Raber, Schenectady, NY (US); Raymond Alan White, Schenectady, NY (US); Paul Leonard Dupree, Scotia, NY (US); Canan Uslu Hardwicke, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,814

(22) Filed: Oct. 22, 2001

(65) Prior Publication Data

US 2003/0082048 A1 May 1, 2003

(Under 37 CFR 1.47)

(51) Int. Cl.[7] .................................................. F01D 5/28
(52) U.S. Cl. .................................. 416/96 R; 29/402.13
(58) Field of Search ...................... 415/200; 416/229 A, 416/241 R, 115, 96 R; 29/402.13, 402.08, 889.1

(56) References Cited

U.S. PATENT DOCUMENTS

| | | | | |
|---|---|---|---|---|
| 3,650,635 A | * | 3/1972 | Wachtell et al. | 415/115 |
| 4,737,205 A | | 4/1988 | Selman et al. | |
| 4,832,252 A | * | 5/1989 | Fraser | 416/241 R |
| 4,849,030 A | * | 7/1989 | Darolia et al. | 148/404 |
| 5,269,057 A | * | 12/1993 | Mendham | 29/402.08 |
| 5,273,708 A | * | 12/1993 | Freeman | 419/35 |
| 5,584,663 A | | 12/1996 | Schell et al. | |
| 5,895,205 A | * | 4/1999 | Werner et al. | 415/208.4 |
| 6,071,470 A | | 6/2000 | Koizumi et al. | |
| 6,331,361 B1 | * | 12/2001 | Esch et al. | 29/889.1 |

OTHER PUBLICATIONS

Rh–Base Refractory Superalloys for Ultra–High Temperature Use, Y. Yamabe–Mitarai, Y. Koizumi, H. Murakami, Y. Ro, T. Maruko and H. Harada, Scripta Materialia, vol. 36, No. 4, pp. 393–398, 1997.

Ir–Base Refractory Superalloys for Ultra–High Temperatures, Y. Yamabe–Mitarai, Y. Ro, T. Maruko, and H. Harada, Metallurgical amd Materials Transactions A, vol. 29A, Feb. 1998, pp. 537–549.

* cited by examiner

Primary Examiner—Edward K. Look
Assistant Examiner—Igor Kershteyn
(74) Attorney, Agent, or Firm—Paul J. DiConza; Patrick K. Patnode (57) ABSTRACT

Methods for repairing and manufacturing a gas turbine airfoil, and the airfoil repaired and manufactured with such methods are presented with, for example, the repair method comprising providing an airfoil having specified nominal dimensions, the airfoil comprising a first material, the first material having a creep life and a fatigue life, the airfoil further comprising a leading edge section and a trailing edge section; removing at least one portion of at least one section of the airfoil to create at least one deficit of material for the airfoil relative to the specified nominal dimensions, the at least one section selected from the group consisting of the leading edge section and the trailing edge section; providing at least one insert comprising a second material, the second material having a creep life that is at least substantially equal to the creep life of the first material, and a fatigue life that is at least substantially equal to the fatigue life of the first material; and disposing the at least one insert onto the airfoil such that the at least one deficit of material is substantially eliminated.

83 Claims, 9 Drawing Sheets

AIRFOILS WITH IMPROVED STRENGTH AND MANUFACTURE AND REPAIR THEREOF

BACKGROUND OF INVENTION

The present invention relates to components designed to operate at high temperatures. More particularly, this invention relates to methods for repair and manufacture of airfoils for gas turbine engines, and the articles made and repaired from the use of these methods.

In a gas turbine engine, compressed air is mixed with fuel in a combustor and ignited, generating a flow of hot combustion gases through one or more turbine stages that extract energy from the gas, producing output power. Each turbine stage includes a stator nozzle having vanes which direct the combustion gases against a corresponding row of turbine blades extending radially outwardly from a supporting rotor disk. The vanes and blades include airfoils having a generally concave "pressure" side and a generally convex "suction" side, both sides extending axially between leading and trailing edges over which the combustion gases flow during operation. The vanes and blades are subject to substantial heat load, and, because the efficiency of a gas turbine engine is proportional to gas temperature, the continuous demand for efficiency improvements translates to a demand for airfoils that are capable of withstanding higher temperatures for longer service times.

Gas turbine airfoils on such components as vanes and blades are usually made of superalloys and are often cooled by means of internal cooling chambers and the addition of coatings, including thermal barrier coatings (TBC's) and environmentally resistant coatings, to their external surfaces. The term "superalloy" is usually intended to embrace iron-, cobalt-, or nickel-based alloys, which include one or more other elements including such non-limiting examples as aluminum, tungsten, molybdenum, titanium, and iron. The internal air cooling of turbine airfoils is often accomplished via a complex cooling scheme in which cooling air flows through channels within the airfoil ("internal air cooling channels") and is then discharged through a configuration of cooling holes at the airfoil surface. Convection cooling occurs within the airfoil from heat transfer to the cooling air as it flows through the cooling channels. In addition, fine internal orifices are often provided to direct cooling air flow directly against inner surfaces of the airfoil to achieve what is referred to as impingement cooling, while film cooling is often accomplished at the airfoil surface by configuring the cooling holes to discharge the cooling air flow across the airfoil surface so that the surface is protected from direct contact with the surrounding hot gases within the engine. TBC's comprise at least a layer of thermally insulating ceramic and often include one or more layers of metal-based, oxidation-resistant materials ("environmentally resistant coatings") underlying the insulating ceramic for enhanced protection of the airfoil. Environmentally resistant coatings are also frequently used without a TBC topcoat. Technologies such as coatings and internal air cooling have effectively enhanced the performance of turbine airfoils, but material degradation problems persist in turbine airfoils due to locally aggressive conditions in areas such as airfoil leading edges and trailing edges.

A considerable amount of cooling air is often required to sufficiently lower the surface temperature of an airfoil. However, the casting process and the cores required to form the cooling channels limit the complexity of the cooling scheme that can be formed within an airfoil at leading and trailing edges of vanes and blades. The resulting restrictions in cooling airflow often promote higher local temperatures in these areas relative to those existing in other locations on a given airfoil. In typical jet engines, for example, bulk average airfoil temperatures range between about 900° C. to about 1000° C., while airfoil leading and trailing edge surfaces often reach about 1100° C. or more. Maximum surface temperatures are expected in future applications to be over about 1300° C. Of particular concern is the combination of stress with temperature, because metals, including alloys used to make gas turbine airfoils, tend to become weaker, or more easily deformed, as temperatures increase. Thus, while stress of a certain level operating on a cooler section of an airfoil may have little effect on performance, the same stress level may be beyond the performance capability of the material at hotter locations as described above. At such elevated temperatures, materials are more susceptible to damage due to a number of phenomena, including diffusion-controlled deformation ("creep"), cyclic loading and unloading ("fatigue"), chemical attack by the hot gas flow ("oxidation"), wear from the impact of particles entrained in the gas flow ("erosion"), and others.

Damage to airfoils, particularly at edges, leads to degradation of turbine efficiency. As airfoils are deformed, oxidized, or worn away, gaps between components become excessively wide, allowing gas to leak through the turbine stages without the flow of the gas being converted into mechanical energy. When efficiency drops below specified levels, the turbine must be removed from service for overhaul and refurbishment. A significant portion of this refurbishment process is directed at the repair of the specific areas of airfoils. In one repair embodiment, for example, crack-filling processes based on brazing techniques are used to repair localized damage on turbine vanes.

In current practice, the original edge material is made of the same material as the rest of the original blade, often a superalloy based on nickel or cobalt. Because this material was selected to balance the design requirements of the entire blade, it is generally not optimized to meet the special local requirements demanded by conditions at the airfoil leading or trailing edges. The performance of alloys commonly used for repair is comparable or inferior to that of the material of the original component, depending upon the microstructure, defect density, and chemistry of the repair material. For example, many turbine airfoils are made using alloys that have been directionally solidified. The directional solidification process manipulates the orientation of metal crystals, or grains, as the alloy is solidified from the molten state, lining the grains up in one selected primary direction. The resultant alloy has enhanced resistance to creep and fatigue during service when compared to conventionally processed materials. Advanced applications employ alloys made of a single crystal for even further improvements in high-temperature creep and fatigue behavior. However, when these components are repaired by conventional processes, using build-up of weld filler material, the resulting microstructure of the repair is typical of welded material, not directionally solidified or single-crystalline. Other repair methods, such as applying powder mixtures wherein one powder melts and densifies the repaired area during heat treatment, results in microstructures that differ from that of the parent alloy. Such microstructures, present in a conventional airfoil material such as a superalloy, may cause the airfoil to require excessively frequent repairs in advanced designs that rely on the benefits of directional solidification or single crystal processing to maintain performance.

Materials are characterized by several properties to aid in determining their suitability for use in demanding applications such as gas turbine airfoils. The term "creep life" is used in the art to refer to the length of time until a standard specimen of material extends to a preset length or fractures when subjected to a given stress level at a given temperature. Similarly, the term "fatigue life" is used in the art to describe the length of time until a standard specimen fractures when subjected to a given set of fatigue parameters, including minimum and maximum stress levels, frequency of loading/unloading cycle, and others, at a given temperature. The term "oxidation resistance" is used in the art to refer to the amount of damage sustained by a material when exposed to oxidizing environments, such as, for example, high temperature gases containing oxygen. Oxidation resistance is generally measured as the rate at which the weight of a specimen changes per unit surface area during exposure at a given temperature. In many cases, the weight change is measured to be a net loss in weight, as metal is converted to oxide that later detaches and falls away from the surface. In other cases, a specimen may gain weight if the oxide tends to adhere to the specimen, or if the oxide forms within the specimen, underneath the surface, a condition called "internal oxidation." A material is said to have "higher" or "greater" oxidation resistance than another if the material's rate of weight change per unit surface area is closer to zero than that of the other material for exposure to the same environment and temperature.

Materials particularly noted for high creep life include oxide dispersion strengthened (ODS) materials and directionally solidified eutectic (DSE) alloys. Several materials from these classes have creep lives about three times those measured for conventional superalloys. ODS materials use mechanical techniques during processing to evenly distribute hard oxide particles of sizes less than about 0.1 micron within a metallic matrix, with the particles serving as a reinforcing phase to strengthen the material. DSE alloys are characterized by carefully controlled chemistry and processing, which produce a unique microstructure comprising the inherent fibrous or, in some cases, lamellar structure of the eutectic phase, with the fibers or lamellae aligned along a desired axis of the cast part in a manner analogous to a fiber-reinforced composite. DSE materials are also notable for excellent fatigue life, with certain alloys having about three times the creep lives measured for conventional superalloys. The careful processing controls needed to produce ODS and DSE alloys cause these materials to be prohibitively expensive.

The so-called "platinum group" of metal elements comprises rhodium (Rh), osmium (Os), platinum (Pt), iridium (Ir), ruthenium (Ru), palladium (Pd), and rhenium (Re) elements noted for high chemical resistance. Several elements from this group are noteworthy as examples of materials with substantially higher oxidation resistance relative to current airfoil materials. Some platinum group metals and several alloys based on platinum group metals possess excellent resistance to oxidation at temperatures exceeding the capabilities of many Ni-based superalloys. The class of materials referred to as "refractory superalloys" offer additional strength over the platinum group metals, though at the expense of some oxidation. resistance. These alloys are based on Ir or Rh, with transition metal additions of up to about 20 atomic percent, and are strengthened by a precipitate phase of generic formula $M_3X$, where M is Rh or Ir and X is typically Ti, V, Ta, or Zr, or combinations thereof. Some alloys of this type can withstand 1–2 hour exposures to at least about 1600° C. without catastrophic oxidation. Creep life and fatigue life data for these alloys are not readily available currently, but the high strength of these alloys suggests they are superior to some degree over conventional superalloys in both creep life and fatigue life at the temperatures and stress levels relevant to gas turbine airfoil components.

Platinum group metals also have been incorporated into conventional superalloy compositions to produce a class of alloys, herein referred to as "platinum-group metal modified superalloys", having enhanced oxidation resistance and comparable mechanical properties to conventional superalloys. Typical alloys of this class comprise a conventional superalloy composition to which is added up to about 7 atomic percent of a platinum group metal, such as Ir, Rh, Pt, Pd, and Ru. These alloys comprise the two-phase microstructure typical of conventional superalloys, where a gamma matrix phase (nickel and other dissolved elements, including the platinum group metal elements) is strengthened by precipitates of the gamma prime phase with a general formula of $Ni_3$ (AlTi). Use of materials incorporating platinum-group metals has been limited to date due to the high density and very high cost of these materials in comparison to more conventional airfoil materials.

SUMMARY OF INVENTION

The selection of a particular alloy for use in a given airfoil design is accomplished based on the critical design requirements for a number of material properties, including strength, toughness, environmental resistance, weight, cost, and others. When one alloy is used to construct the entire airfoil, compromises must be made in the performance of the airfoil because no single alloy possesses ideal values for the long list of properties required for the airfoil application, and because conditions of temperature, stress, impingement of foreign matter, and other factors are not uniform over the entire airfoil surface.

It would be advantageous if the performance of both newly manufactured and repaired airfoils could be improved to better withstand the aggressive stress-temperature combinations present in localized areas on turbine components. However, it would not be desirable if improvements to creep life and fatigue life were effected at the expense of other design critical requirements of the airfoil. For example, a blade made entirely of DSE material would have excellent creep and fatigue properties, but would cost many times the price of a blade made of conventional superalloy material. Therefore, it would be beneficial if turbine airfoils could be improved in a manner that would allow for enhanced performance in regions susceptible to damage due to locally aggressive conditions without significantly detracting from the overall performance of the airfoil.

One embodiment of the present invention provides a method for repairing a gas turbine airfoil, comprising: a. providing an airfoil having specified nominal dimensions, the airfoil comprising a first material having a creep life and a fatigue life, the airfoil further comprising a leading edge section and a trailing edge section; b. removing at least one portion of at least one section of the airfoil to create at least one deficit of material for the airfoil relative to the specified nominal dimensions, the at least one section selected from the group consisting of the leading edge section and the trailing edge section; c. providing at least one insert comprising a second material, the second material having a creep life that is at least substantially equal to the creep life of the first material, and a fatigue life that is at least substantially equal to the fatigue life of the first material; and d. disposing the at least one insert onto the airfoil such that the at least one deficit of material is substantially eliminated.

Another aspect of the invention provides a method for manufacturing a gas turbine airfoil having specified nominal dimensions, a leading edge section, and a trailing edge section, the method comprising: a. providing an airfoil having at least one deficit of material relative to at least one specified nominal dimension, the airfoil comprising a first material having a creep life and a fatigue life, the at least one deficit located in at least one section of the airfoil selected from the group consisting of the leading edge section and the trailing edge section; b. providing at least one insert comprising a second material, the second material having a creep life that is at least substantially equal to the creep life of the first material, and a fatigue life that is at least substantially equal to the fatigue life of the first material; and c. disposing the at least one insert onto the airfoil such that the at least one deficit of material is substantially eliminated.

Another aspect of the invention provides an insert for the manufacture and repair of a gas turbine airfoil, the airfoil comprising a leading edge section and a trailing edge section and having specified nominal dimensions for an airfoil external surface, the insert comprising: an external surface that substantially conforms with the specified nominal dimensions for the airfoil external surface at a section of the airfoil selected from the group consisting of the leading edge section and the trailing edge section; and a material having a creep life at about 1100° C. of at least about 50 hours at about 140 MPa and a fatigue life of at least about 4,000 cycles in axial-axial low cycle fatigue testing, the fatigue testing being performed at about 1100° C. and with a strain range of about 0.25% at about 20 cycles per minute.

Another aspect of the invention provides a gas turbine airfoil comprising a main body, the main body comprising a first material, the first material having a creep life and a fatigue life, and the airfoil further comprising at least one insert comprising a second material, the second material having a creep life that is at least substantially equal to the creep life of the first material, and a fatigue life that is at least substantially equal to the fatigue life of the first material, the at least one insert joined to the main body, the airfoil comprising a leading edge section and a trailing edge section, wherein the at least one insert comprises at least one portion of at least one section of the airfoil selected from the group consisting of the leading edge section and the trailing edge section.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRITION

Structure, manufacture, and repair embodiments of the present invention are useful for components that operate at elevated temperatures, and particularly components of gas turbine engines such as the airfoils of blades (also referred to as "buckets") and vanes (also referred to as "nozzles") where the maximum metal temperatures typically range from about 1000° C. to over about 1200° C. in current systems and temperatures over about 1300° C. are envisioned for future applications.

Figure 1:
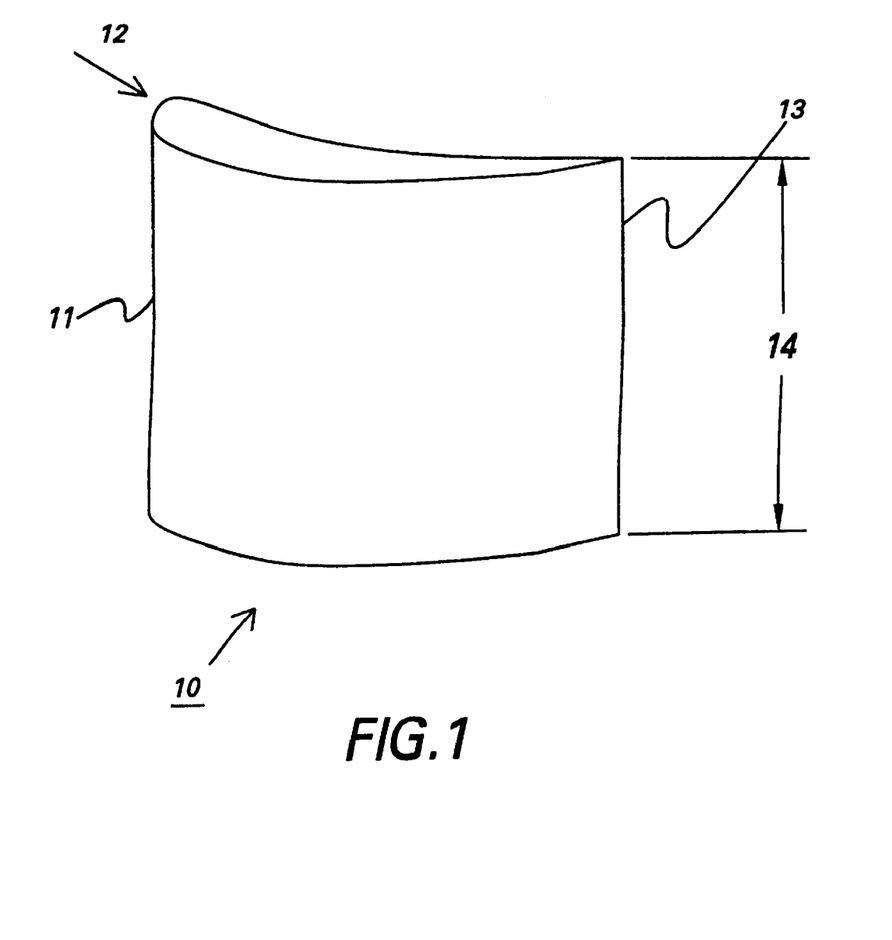
FIG. 1 is an isometric view of a conventional airfoil.
Figure 2:
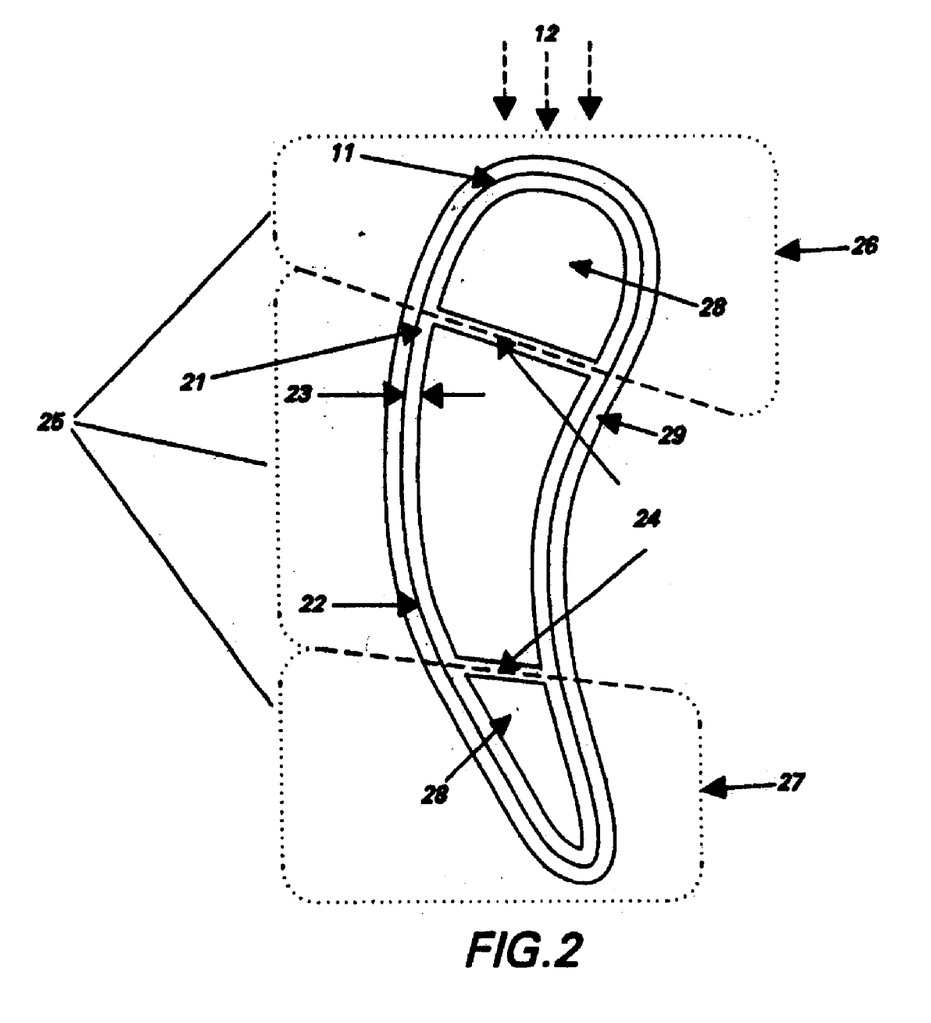
FIG. 2 is a cross sectional view of the airfoil of FIG. 1.
Figure 3:
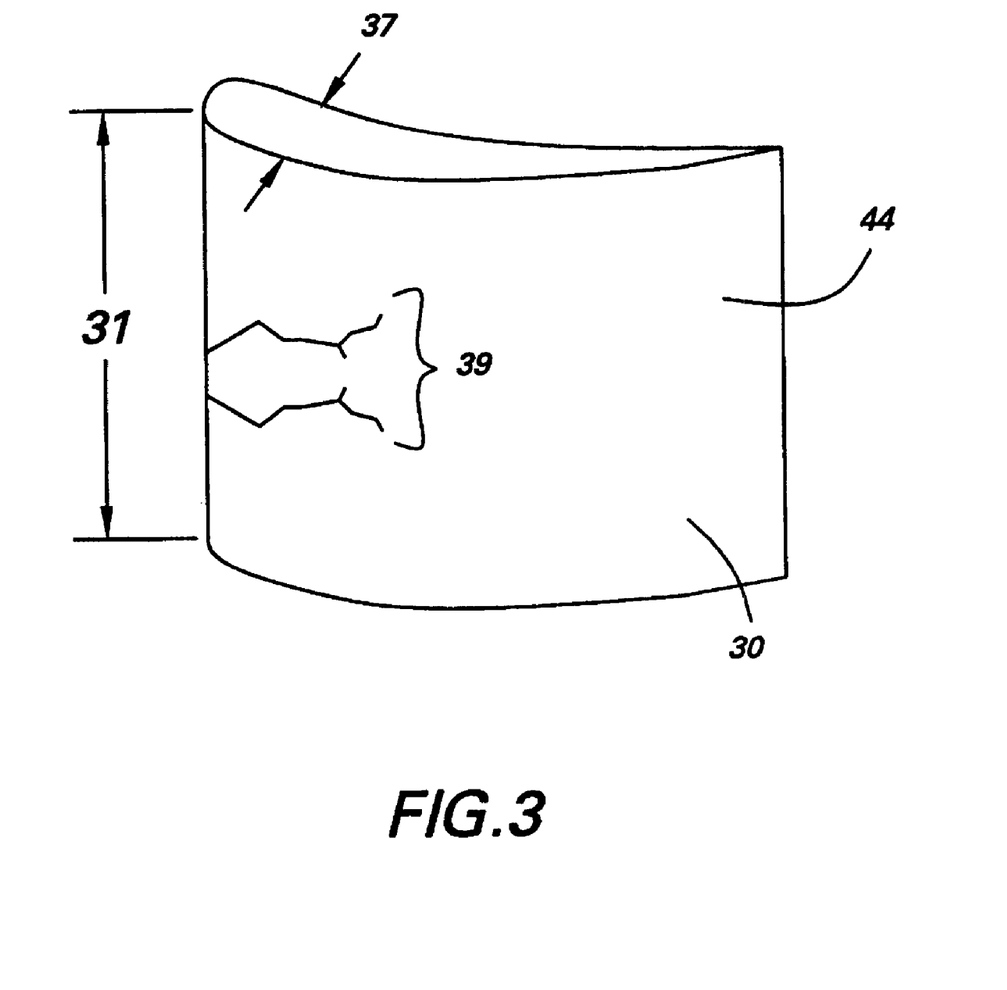
FIG. 3 is an isometric view of an airfoil to be repaired.
Figure 4:
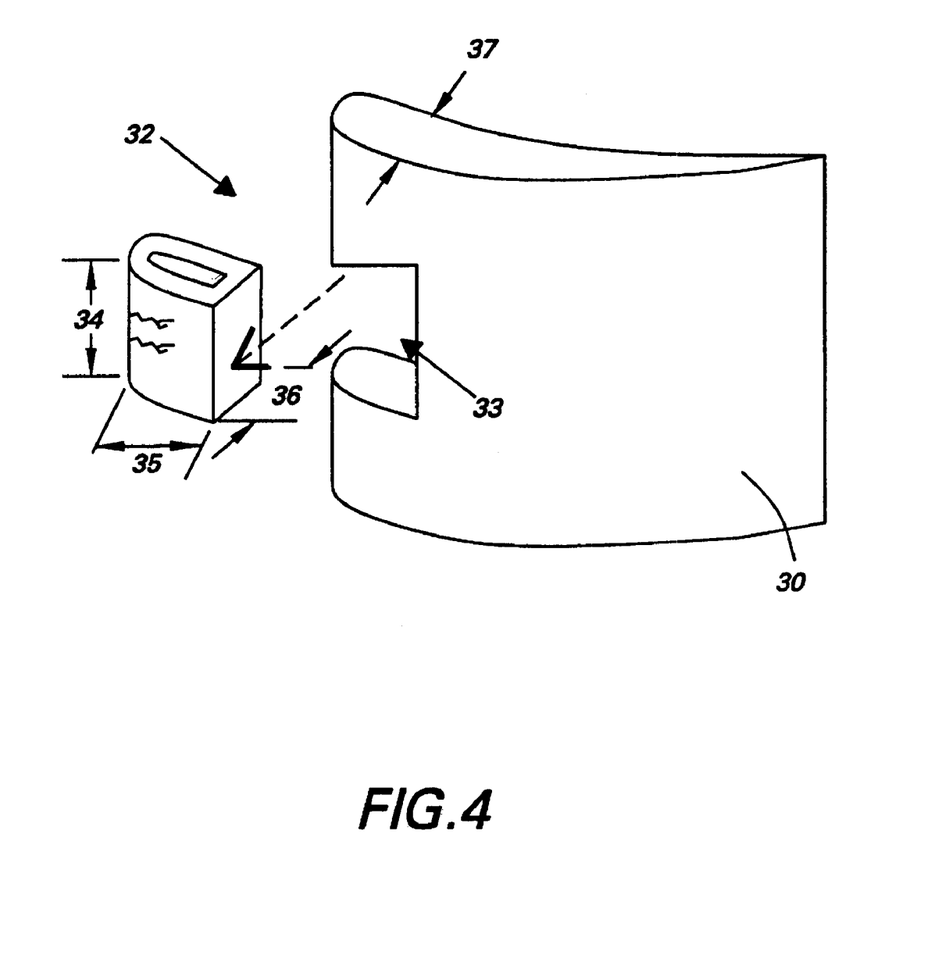
FIG. 4 shows the removal of a damaged portion of an airfoil.
Figure 5:
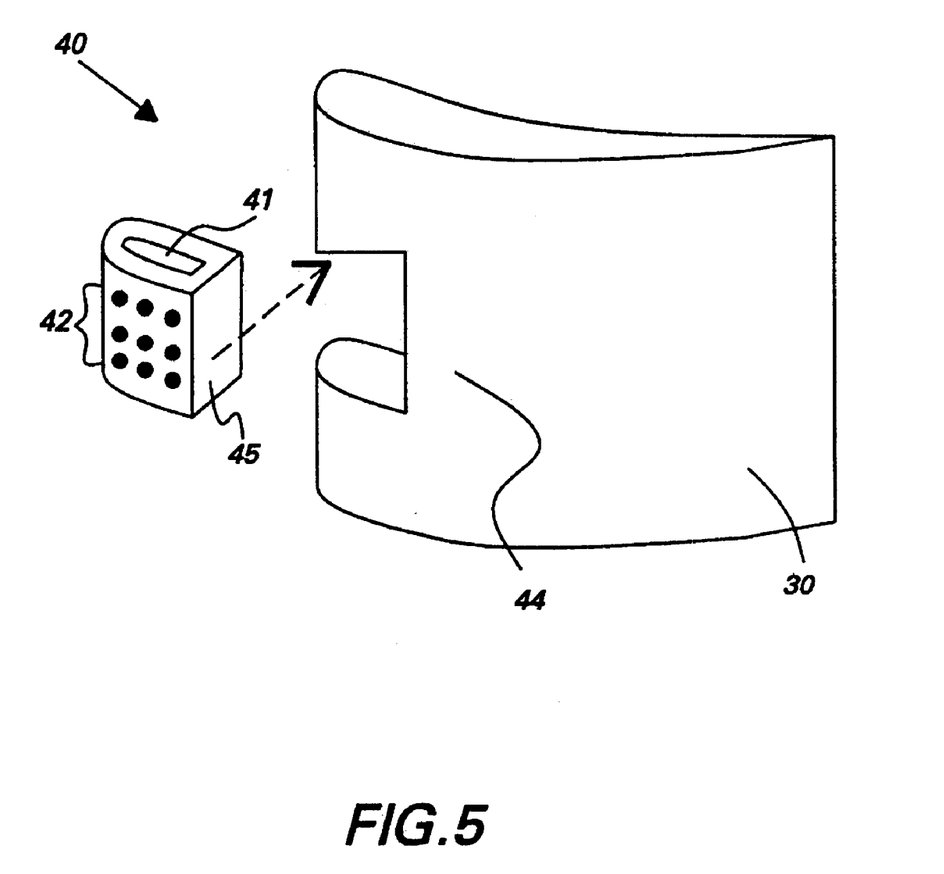
FIG. 5 depicts an insert ready for disposition on the airfoil.

Referring to FIG. 1, a gas turbine airfoil 10 comprises a leading edge 11 located at the edge of the airfoil which, during operation, is first contacted by the flow of gas 12; and a trailing edge 13 located at the edge of the airfoil on the opposite side of the airfoil from the leading edge 11. The cross-sectional view of the airfoil in FIG. 2 shows that the airfoil further comprises an external wall 21 with an external surface 22 that defines the perimeter of the airfoil, and the external wall 21 further comprises a cross sectional thickness 23. Typical airfoils further comprise at least one transverse internal wall 24 dividing the airfoil into a plurality of sections 25, including a leading edge section 26 and a trailing edge section 27. Each of the leading edge section 26 and the trailing edge section 27 comprise an internal cooling channel 28 and its adjacent transverse internal wall 24. A coating 29, comprising at least one of a thermal barrier coating, an environmentally resistant coating, or combinations thereof, is optionally applied to the external surface 22 of the airfoil. The coating 29 comprises at least one layer, and optionally, in the case where a combination of a ceramic thermal barrier coating and an environmentally resistant coating is employed, a plurality of layers.

The dimensions of the airfoil 10 (FIG. 1) depend upon the particular airfoil design under consideration. Typically, design parameters such as, for example, the airfoil height 14 and the shape of the airfoil external surface 22 (FIG. 2), have preferred, or "nominal" values and tolerance ranges documented in technical specifications for the. purposes of quality control. Thus it is commonly accepted in the art to refer to, for example, "specified nominal dimensions" for an external surface 22 of an airfoil, which in this example would signify the nominal shape documented for the airfoil external surface 22 in the pertinent technical specification.

Figure 6:
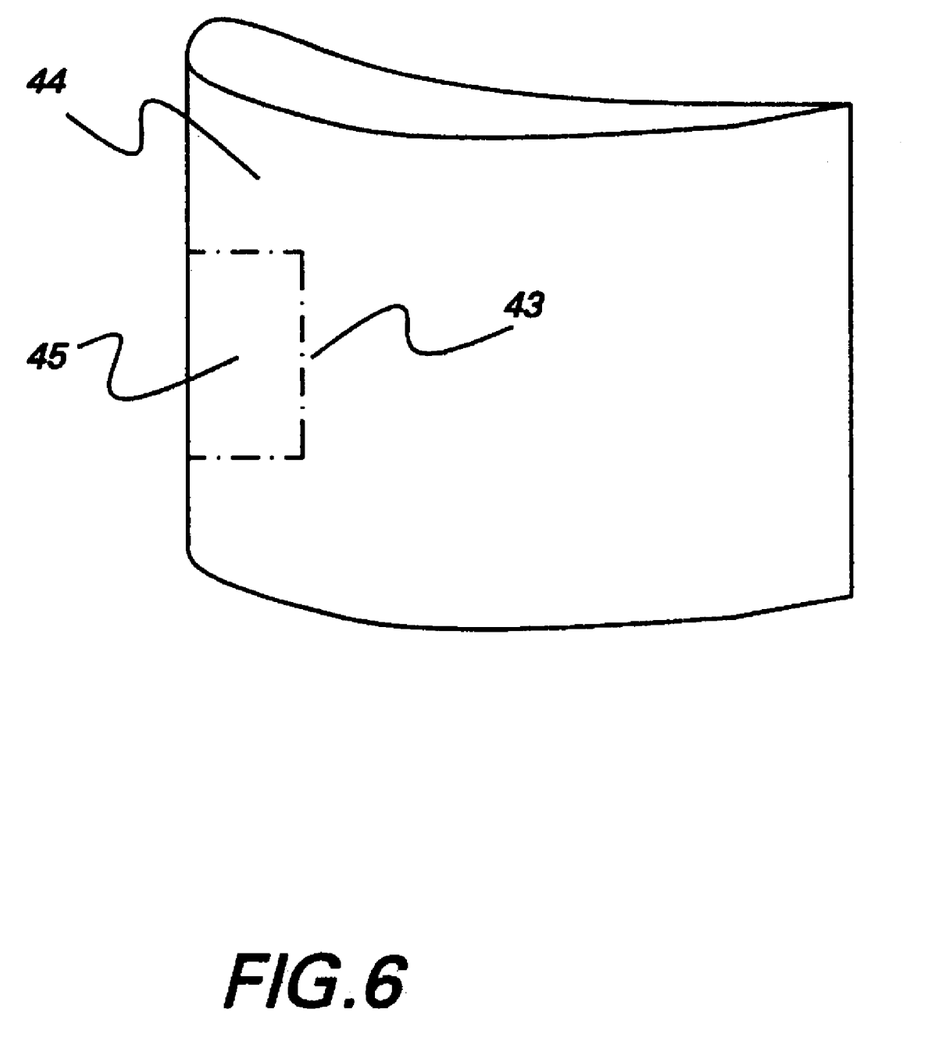
FIG. 6 illustrates an airfoil after repair or manufacture.

Embodiments of the present invention provide a method for repairing a gas turbine airfoil. A non-limiting example of an embodiment of the invention in which a repair is executed at an airfoil leading edge is illustrated in FIGS. 3–6. The method for repairing a gas turbine airfoil comprises providing an airfoil 30 (FIG. 3) having specified nominal dimensions, the airfoil 30 comprising a first material 44 having a creep life and a fatigue life, and the airfoil 30 further comprising a leading edge section 26 (FIG. 2) and a trailing edge section 27 (FIG. 2); removing at least one portion 32 (FIG. 4) of at least one section of the airfoil 30 to create at least one deficit 33 of material for the airfoil relative to the specified nominal dimensions, the at least one section selected from the group consisting of the leading edge section 26 and the trailing edge section 27; providing at least one insert 40 (FIG. 5) comprising a second material 45 (FIG. 5), the second material 45 having a creep life that is at least substantially equal to the creep life of the first material 44, and a fatigue life that is at least substantially equal to the fatigue life of the first material 44; and disposing the at least one insert 40 onto the airfoil 30 such that the at least one deficit 33 of material is substantially eliminated (FIG. 6). The term "substantially eliminated" used herein means that the at least one deficit 33 is at least reduced to within dimensional tolerance limits specified for the section of the airfoil where the second material is disposed. The term "substantially equal" as used herein means that the value measured for the second material falls within a range of from about 80% of the value measured for the first material to about 120% of the value measured for the first material. Removal of the at least one portion is accomplished using any of a variety of material removal methods, including such examples as cutting, grinding, and electric discharge machining. The section to be removed often shows some sort of damage 39 (FIG. 3) including, for example, cracks, oxidation, and wear. The height 34 (FIG. 4) of the at least one portion removed is typically in the range of from about 50% to about 100% of the height 31 (FIG. 3) of the airfoil. In one embodiment, the depth 35 (FIG. 4) of the at least one portion ranges from a depth equivalent to the cross-sectional thickness 23 (FIG. 2) of the external wall 21 (FIG. 2) to the entirety of the at least one section of the airfoil, including the transverse internal wall 24 (FIG. 2) of the particular section being removed. In particular embodiments, only a fraction of the transverse internal wall 24 is removed, in order to provide the remaining fraction of the transverse internal wall 24 as a bonding surface when the insert 40 is disposed. The thickness 36 (FIG. 4) of the at least one portion removed is typically in the range from about 50% to about 100% of the thickness 37 (FIG. 3) of the airfoil at the position where the material is excised.

In certain embodiments of this invention, disposing comprises joining the insert 40 (FIG. 5) to the airfoil. In particular embodiments, the joint line 43 (FIG. 6) between the first material 44 and the second material 45 is located well away from the region subjected to the original damage 39, so that the properties of the joint are adequate to perform under the stress temperature combinations everywhere along the joint line 43. In certain embodiments, joining comprises a process selected from the group consisting of brazing, welding, diffusion bonding, and combinations thereof.

In some cases, special consideration regarding the selection of the joining process is required, especially where large differences in melting point exist between the airfoil material and the second material. For example, where the first material 44 comprises a Ni-based superalloy with an exemplary melting temperature range from about 1300° C. to about 1350° C. and the second material 45 comprises a large amount of a platinum-group metal, with a melting temperature of at least about 1500° C., the employment of a joining process that generates low heat input into the airfoil is useful to avoid overheating the airfoil material. For example, brazing techniques and diffusion bonding processes are less likely to overheat the airfoil than welding processes. Diffusion bonding comprises bringing the components to be joined into intimate contact and heating them to a sufficiently high temperature such that solid-state diffusion occurs at the interface between the two components, forming a continuous solid bond. Fixtures (not shown) are used to ensure intimate contact is maintained throughout the procedure. In one embodiment of the present invention, the diffusion bonding temperature is at least about 1200° C. so that a suitable bond can be achieved in about 4 hours.

In certain embodiments, after the insert 40 has been disposed onto the airfoil, further process steps are used to ensure the repaired airfoil meets design requirements. for proper operation. Examples of such requirements include, but are not limited to, surface finish specifications, dimensional requirements, and bond strength requirements for the bond joining the second material to the airfoil wall. In one embodiment, a step of heat-treating the repaired airfoil is used to improve the bonding between the second material and the airfoil, to relieve stresses accumulated by the repair process, and to improve the metallurgical condition of the overall part in terms of its grain size and precipitate phase distribution. Such a heat treatment step is typically done in vacuum or in an inert gas to avoid oxidizing the part, and is carried out using the process specified for the particular alloy comprising the first material to ensure the metallurgical properties of the alloy are within the range specified for the airfoil when processing is completed In other embodiments, the step of disposing the insert comprises one or more machining operations, including grinding, milling, or other such processes, to restore the airfoil to specified final dimensions and.surface finish requirements. In certain embodiments this machining step includes a process such as grinding to provide a surface finish for the repaired airfoil that meets the pertinent specification limit. Particular embodiments have a coating 51 (FIG. 7) applied to the airfoil to afford even further high-temperature protection. This coating 51 typically comprises at least one layer, and optionally, in the case where a combination of a ceramic thermal barrier coating and an environmentally resistant coating is employed, a plurality of layers.

The insert 40 used in certain embodiments of this invention further comprises at least one internal cooling channel 41, and in particular embodiments the insert further comprises a plurality of cooling holes 42. The cooling holes 42 are created using any one of a number of techniques, including techniques such as, for example, laser drilling, electric discharge machining, and electron beam drilling. These features add to the ability of the finished airfoil to perform under demanding thermal conditions. An advantage of these embodiments of the invention is that the insert offers the potential to incorporate more complex and efficient cooling features than are found on conventional airfoils. Inserts suitable for use at the leading edge and trailing edge sections of airfoils are small castings relative to conventional airfoils, and incorporation of more complicated cooling features using current casting technology is more readily accomplished for such smaller castings. Thus, an airfoil repaired or manufactured according to particular embodiments of this invention will potentially achieve reduced metal temperatures with the same cooling flows as conventional airfoils.

In certain embodiments of the invention, the first material 44 comprises a superalloy based on a metal selected from the group consisting of cobalt, iron, and nickel. The first material is conventionally cast in certain embodiments, while in others the first material comprises directionally solidified material. Still other embodiments employ a single-crystal material as the first material. In other embodiments, the second material 45 comprises a superalloy based on a metal selected from the group consisting of cobalt, iron, and nickel. The second material is conventionally cast in certain embodiments, while in others the second material comprises a directionally solidified material, and in selected embodiments, the second material comprises a single crystal material. The directionally solidified and single crystal embodiments are provided to enhance the high temperature performance of the airfoil during service.

In selected embodiments of the invention, the second material comprises an alloy composition essentially the same as said first material. In this context, "essentially the same" means the elemental constituents and their concentrations are equivalent for the first and second materials, within the specified tolerance limits of the particular alloy in question. Having the first and second materials be essentially the same alloy in a repair method restores to the airfoil a metal structure and chemistry similar to those of the original an improvement over conventional repair methods described above.

The airfoil leading edge and trailing edge often reach temperatures over about 200° C. higher than the average temperature of the airfoil. As such, these particular locations are collectively referred to herein as "hot-spots." Because of the particularly aggressive combination of stress and temperature present at hot-spots, creep life and fatigue life are two of several primary performance characteristics required for materials in these sections. The temperature range of interest in references to creep life, fatigue life, and oxidation resistance herein includes the range of from about 900° C. to about 1200° C., and relative statements made herein comparing creep rupture lives, fatigue lives, and oxidation resistances of various materials assume equivalent levels of stress, temperature, and other critical factors for each material being compared.

In certain embodiments of the present invention, the creep life of the second material is greater than the creep life of the first material. In other embodiments (which may be in combination or separate from the creep life comparison embodiments), the fatigue life of the second material is greater than the fatigue life of said first material. In particular embodiments, the creep life of the second material is at least about three times greater than the creep life of the first material, and in other embodiments (which may be in combination or separate from the creep life comparison embodiments) the fatigue life of the second material is at least about three times greater than the fatigue life of the first material. With a material having higher creep life or higher fatigue life in place at one or more hot-spots, an airfoil is better able to withstand the severe environment existing locally at these locations than even a new conventional airfoil.

The second material comprises a directionally solidified eutectic (DSE) in certain embodiments of the invention. Particular embodiments of this type employ a DSE comprising nickel (Ni), tantalum (Ta), and carbon (C), herein referred to as "NiTaC", and an exemplary NiTaC composition is shown in the Table. NiTaC alloys of this type form a fibrous microstructure with very strong and hard tantalum carbide fiber-shaped phase reinforcing a more ductile Ni-based metallic matrix phase. The table also displays an alternate DSE composition, referred to herein as NiNbC, where niobium (Nb) is used as the carbide forming element in place of Ta. DSE Alloys of the types exemplified by the compositions displayed in the Table exhibit creep rupture lives exceeding those of commonly used single-crystal superalloys by a factor in the range from about 2 to about 10, where the test load is about 140 MPa at a temperature of about 1100° C. Fatigue lives for these exemplary alloys exceed those of commonly used single crystal alloys by a factor in the range of from about 1.5 to about 5 at a temperature of about 1100° C., where the strain range is about 0.25% and the frequency is about 20 cycles per minute.

[t1]

In other embodiments where the second material creep life is higher than that of the first material, the second material comprises an oxide dispersion strengthened (ODS) material. Two exemplary compositions are displayed in the Table. The alloy names MA754 and MA6000 are trademarks of Inco, Limited. In particular embodiments of this type, the ODS material comprises Ni, chromium (Cr), aluminum (Al), and yttium oxide. The uniform dispersion of sub-micron-sized yttrium oxide particles, typically present in a concentration range of from about 0.5 volume % to about 2.5 volume %, and their large-grained and elongated-grained microstructures, provide a remarkably stable and effective barrier to dislocation motion, accounting for the excellent creep life of these materials. ODS alloys of the types exemplified by the compositions displayed in the Table exhibit creep rupture lives exceeding those of commonly used single-crystal superalloys by a factor in the range from about 2 to about 10, where the test load is about 140 MPa at a temperature of about 1100° C. The chromium in the alloys, present from about 15 weight % to about 20 weight %, provides effective oxidation resistance to the Ni-based matrix.

Still other embodiments employ a second material comprising a refractory superalloy, and in particular embodiments, the refractory superalloy comprises rhodium (Rh). In particular embodiments of the present invention, the second material comprises Rh at a level of at least about 65 atomic percent. Alloys comprising iridium at such levels have been shown to exhibit poor oxidation resistance in the environments under consideration for the present invention, and thus in particular embodiments of the invention, the refractory superalloy comprises Ir at a level of at most about 5 atomic percent. To attain the required mechanical properties, the refractory superalloys further comprise a quantity of additional material, where the quantity of additional material comprises at least one supplementary element selected from the group consisting of titanium (Ti), vanadium (V), zirconium (Zr), niobium (Nb), molybdenum (Mo), hafnium (Hf), tantalum (Ta), tungsten (W), and mixtures thereof. These alloys do not resist oxidation to the levels shown by the Pt-group metals themselves, but their combination of oxidation resistance and mechanical properties is often suitable for use in embodiments of the present invention. In particular embodiments, the at least one supplemental element is present in the second material at a level of up to about 7 atomic percent. In other embodiments, the quantity of additional material comprises a plurality of supplemental elements, each supplemental element selected from the same group as listed above for the at least one supplementary element. In certain of these embodiments comprising a plurality of supplemental elements, the quantity of additional material is present in the second material at a level at or below about 10 atomic percent.

In particular embodiments of the current invention, the second material comprises a platinum-group-metal-modified Ni-based superalloy. A non-limiting example of an

| Alloy (w/o) | Ni | Cr | Co | Al | W | Mo | Re | Ta | Nb | C | B | Zr | Ti | Fe | Y2O3 |
|---|---|---|---|---|---|---|---|---|---|---|---|---|---|---|---|
| NiTaC | Bal | 4.2 | 3.9 | 5.5 | 4.5 | 3.2 | 6.8 | 9.0 | 0 | .27 | .01 | 0 | 0 | 0 | 0 |
| NiNbC | Bal | 4 | 10 | 6 | 10 | 0 | 0 | 0 | 3.8 | .5 | 0 | 0 | 0 | 0 | 0 |
| MA754 | Bal | 20 | 0 | .3 | 0 | 0 | 0 | 0 | 0 | .05 | 0 | 0 | .5 | 1 | .6 |
| MA6000 | Bal | 15 | 0 | 4.5 | 4 | 2 | 0 | 2 | 0 | .05 | .01 | .15 | 2.5 | 0 | 1.1 | alloy of this type suitable for use in embodiments of the present invention is described in U.S. Pat. No. 4,737,205 and comprises the following nominal composition (in weight percent): about 8.0% chromium, about 9.5% cobalt, about 11.4% tungsten, about 1.5% niobium, about 5.1% aluminum, about 1.7% titanium, about 0.09% carbon, about 0.02% boron, about 0.07% zirconium, about 9.9% platinum, and the balance nickel.

The insert employed in this and other embodiments of the present invention does not necessarily comprise only one type of material. An example of a case where the insert comprises multiple materials is where most (greater than 70%) of the insert by weight comprises a strong material, such as a NiTaC DSE, and the remainder comprises a thin (about 0.127 mm about 0.635 mm, or about 0.005"–about 0.025") outer layer of a metal selected from the group consisting of Rh, Pt, Pd, and mixtures thereof. The outer layer provides oxidation resistance, while the DSE material comprising the remainder of the insert provides the high temperature creep and fatigue life properties described above.

The collection of alloys discussed above does not represent an exhaustive list of all possible materials that may be employed to form embodiments of the present invention. These materials are discussed in order to illustrate the concepts of the present invention and the manner in which their properties can be advantageously exploited to achieve improved turbine airfoil life. A significant benefit of embodiments of the present invention is that the advantages of the second material are applied without sacrificing the overall design requirements of the component, because the second material is disposed only in the sections of the airfoil wall that require the extraordinary properties, while the remainder of the airfoil comprises first material, selected in accordance with the pertinent design requirements for the particular airfoil. Potentially disadvantageous properties of certain second materials, such as high cost or density, have a reduced effect on the overall airfoil because the second material comprises only a fraction of the overall surface area of the airfoil. The properties of the airfoil are thus "tailored" to the expected localized environments, reducing the need for compromise during the design process for new airfoils, and increasing the expected lifetime for repaired articles operating in current systems.

Another embodiment of the invention provides a method for manufacturing a gas turbine airfoil 30 (FIG. 3) having specified nominal dimensions, a leading edge section 26 (FIG. 2), and a trailing edge section 27 (FIG. 2), the method comprising: providing an airfoil 30 having at least one deficit 33 (FIG. 4) of material relative to at least one specified nominal dimension, the airfoil comprising a first material 44 (FIG. 3) having a creep life and a fatigue life, the at least one deficit 33 located in at least one section of the airfoil 30 selected from the group consisting of the leading edge section 26 and the trailing edge section 27; providing at least one insert 40 (FIG. 5) comprising a second material 45 (FIG. 5), the second material having a creep life that is at least substantially equal to the creep life of the first material, and a fatigue life that is at least substantially equal to the fatigue life of the first material; and disposing the at least one insert 40 onto the airfoil 30 such that the at least one deficit 33 of material is substantially eliminated (FIG. 6). The first and second materials may have the same characteristics as previously discussed for the first and second materials in other embodiments, above. The alternatives for the composition of the second material discussed previously for the repair method embodiments are also applied in certain of the manufacturing method embodiments. Furthermore, the alternative embodiments relating to aspects of the disposing step, set forth above for the repair method embodiments, are also pertinent to the manufacturing method embodiments of the present invention. In certain embodiments, heat treatment and machining steps are included in the manufacturing process, for the same reasons as described above for repair method embodiments, as is the step of applying a coating 51 (FIG. 7) to the airfoil to afford further high-temperature protection. Particular embodiments provide that the insert 40 further comprises at least one internal channel 41 (FIG. 5) to allow for internal air cooling of the airfoil section during service, and as described above for the repair method embodiments, certain embodiments of the invention include a plurality of cooling holes 42 (FIG. 3) in the insert 40.

Figure 7:
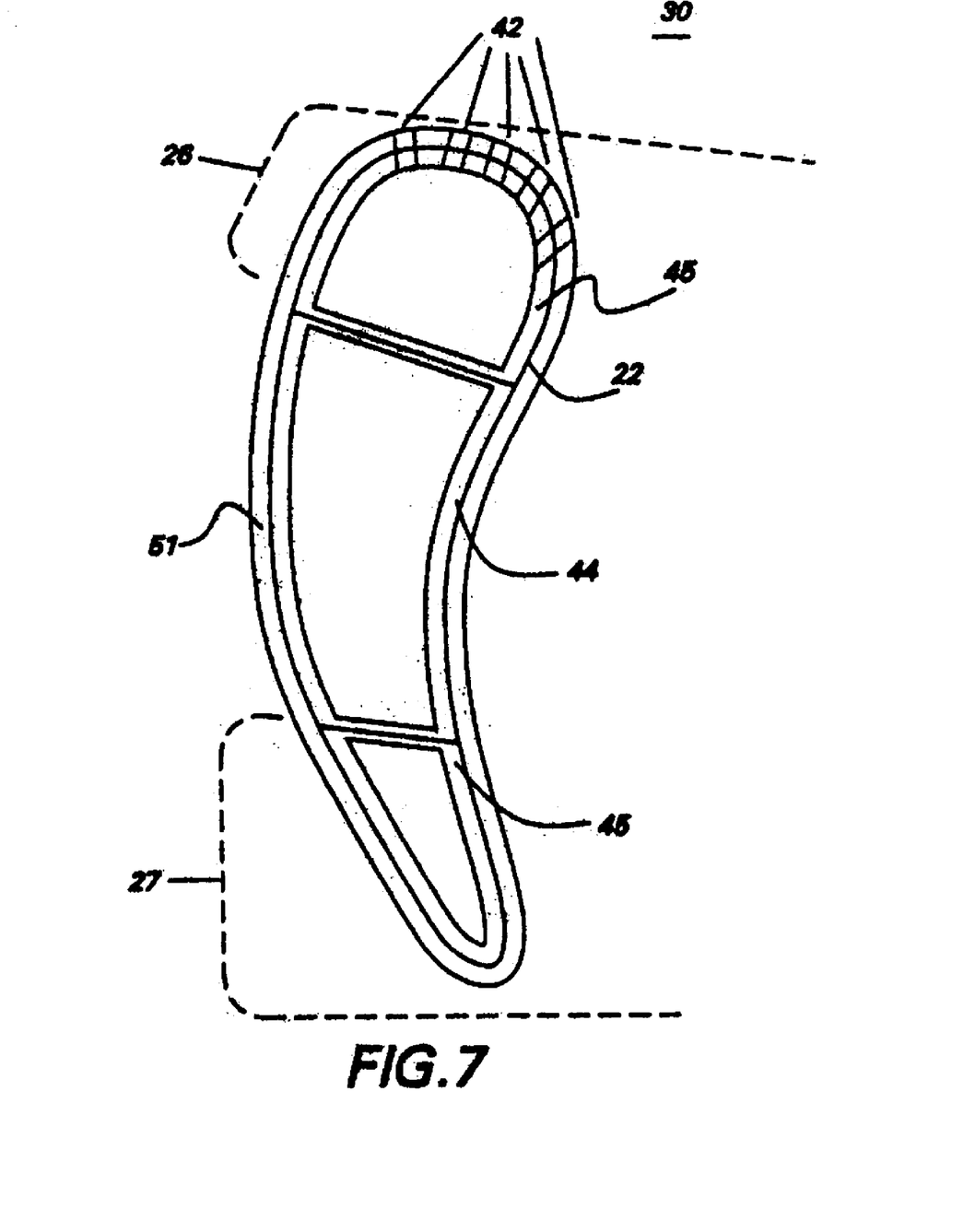
FIG. 7 shows a cross section of an airfoil.
Figure 8:
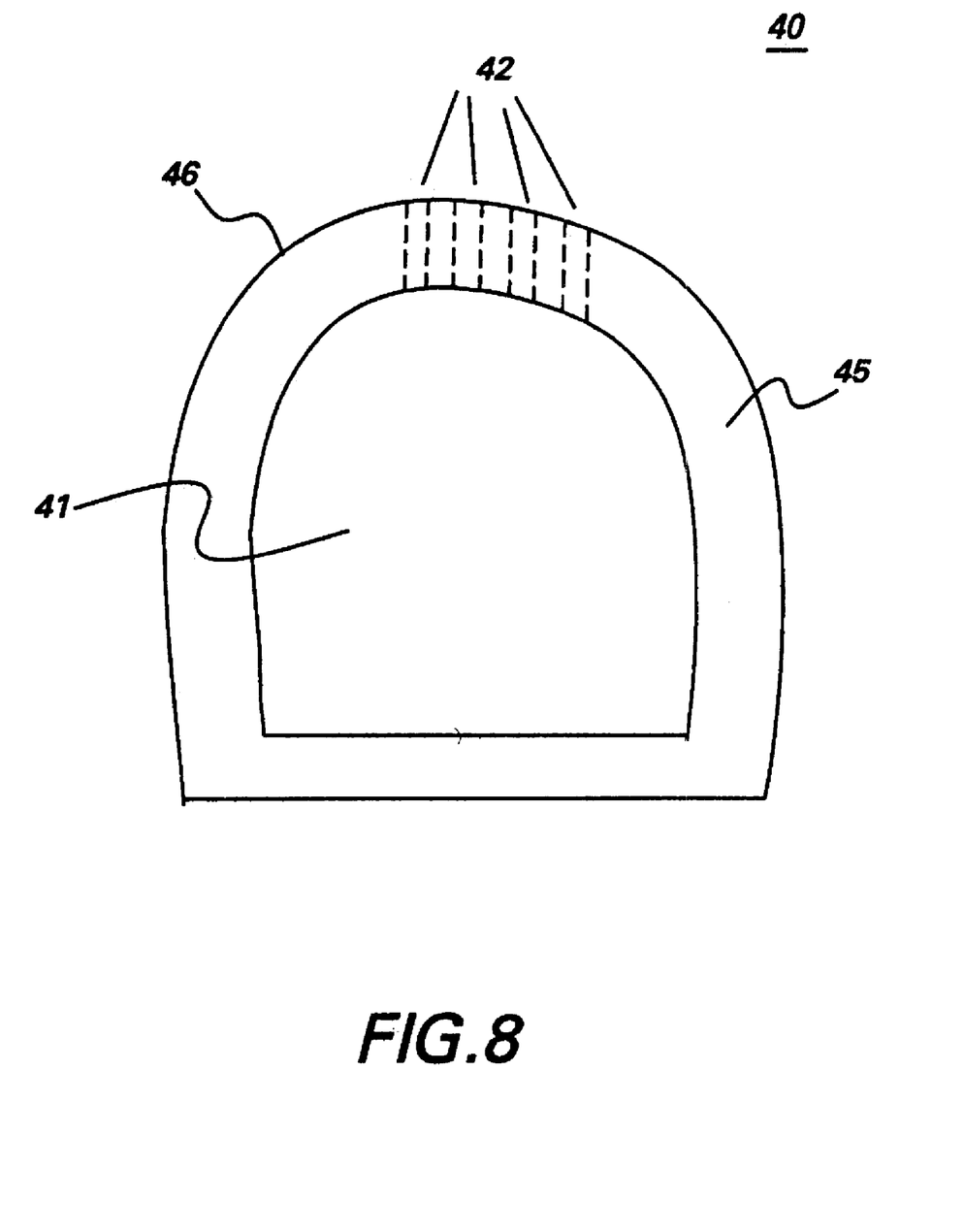
FIG. 8 depicts a cross section of an insert.

Another embodiment of the invention, non-limiting examples of which are depicted in FIGS. 7 and 8, provides an insert 40 (FIG. 8) for the manufacture and repair of a gas turbine airfoil 60 (FIG. 7), the airfoil having specified nominal dimensions for an airfoil external surface 22 (FIG. 7), the insert comprising an external surface 46 (FIG. 8) that substantially conforms with the specified nominal dimensions for the airfoil external surface 22 at a section of the airfoil selected from the group consisting of the leading edge section 26 and the trailing edge section 27; and a material having a creep life at about 1100° C. of at least about 50 hours at about 140 MPa and a fatigue life of at least about 4,000 cycles in axial-axial low cycle fatigue testing, the fatigue testing being performed at about 1100° C. and with a strain range of about 0.25% at about 20 cycles per minute. The term "substantially conforms" as used herein means that upon disposition of the insert onto the airfoil, the resulting external surface 22 is within specified tolerance limits for the specific section in which the insert is disposed, either as-disposed or with routine machining to blend the surfaces.

In particular embodiments, the creep life of the insert material is greater than about 150 hours at the conditions noted above, and in other embodiments the fatigue rupture life of the insert material is greater than about 12,000 cycles at the conditions noted above. Suitable alternatives for the composition of the second material, discussed previously for the repair method and manufacturing method embodiments, are also applied in certain insert embodiments. Certain insert embodiments provide that the insert 40 further comprises at least one cooling channel 41, and other embodiments provide that the insert 40 further comprises a plurality of cooling holes 42 (FIG. 8), as described for the above embodiments.

According to the embodiments of this invention, any of a variety of metal fabrication and processing methods is suitable to fabricate the insert. Examples of suitable processes include, but are not limited to, casting (including directional solidification and single crystal processing methods); forging; extruding; in-situ processing of braze tape; or forming on a sacrificial mandrel by deposition processes such as electron beam physical vapor deposition, chemical vapor deposition, ion plasma deposition, thermal spraying, and electroplating.

Figure 9:
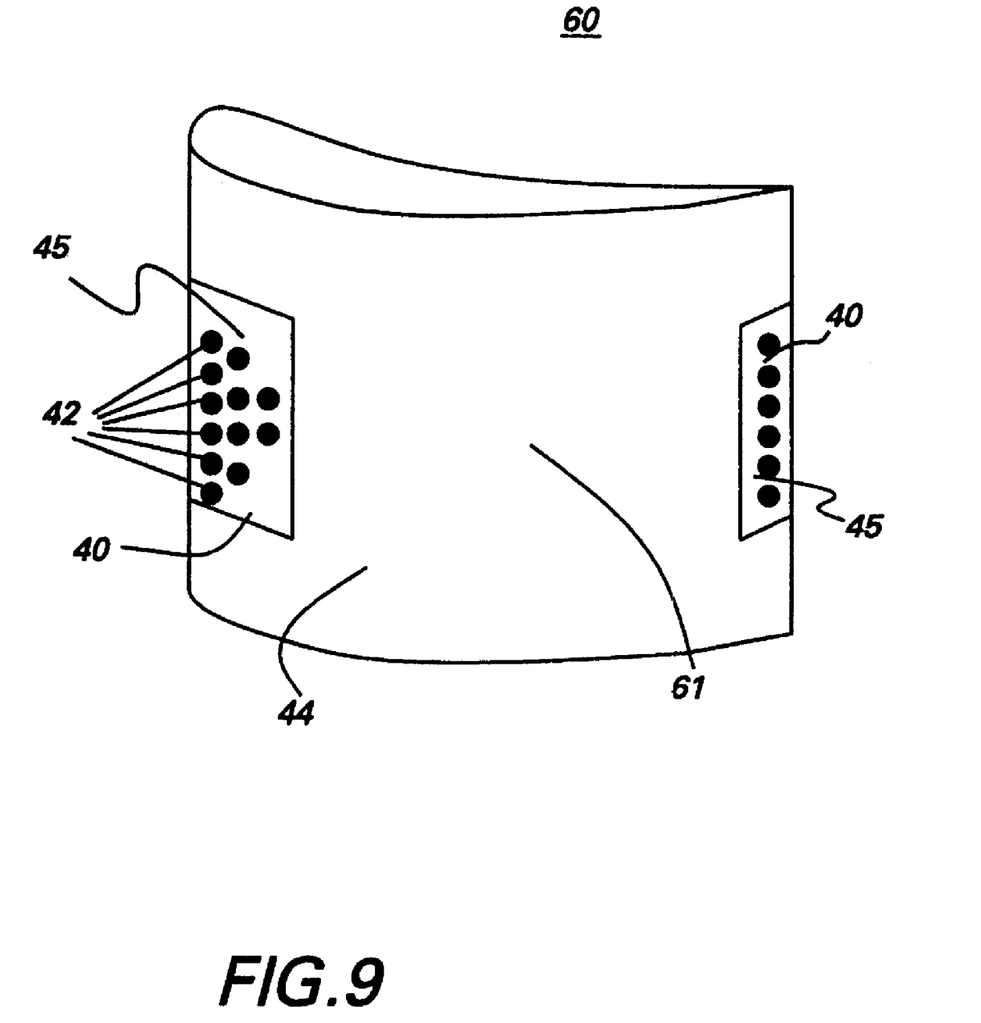
FIG. 9 is an isometric view of an airfoil.

Referring to FIG. 9, other embodiments of the current invention provide for a gas turbine airfoil 60, comprising: a main body 61 comprising a first material 44, the first material having a creep life and a fatigue life, and at least one insert 40 comprising a second material 45, the second material having a creep life that is at least substantially equal to the creep life of the first material 44, and a fatigue life that is at least substantially equal to the fatigue life of the first material 44, the at least one insert 40 joined to the main body 61, the airfoil comprising a leading edge section 26 and a trailing edge section 27, wherein the at least one insert 40 comprises at least one portion of at least one section of the airfoil 60 selected from the group consisting of the leading edge section 26 and the trailing edge section 27.

The first material and the second material have the characteristics described for the first material and the second material in previously discussed embodiments. The alternatives for the composition of the second material, discussed previously for the repair method, manufacturing method, and insert embodiments, are also applied in certain airfoil embodiments. Embodiments relating to the existence of at least one cooling channel 41 in the insert 40 and a plurality of cooling holes 42, and coating 51 (FIG. 7), as described for the above embodiments, are also provided for certain airfoil embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for repairing a gas turbine airfoil, comprising:
   a. providing an airfoil having specified nominal dimensions, said airfoil comprising a first material, said first material having a creep life and a fatigue life, said airfoil further comprising a leading edge section and a trailing edge section;
   b. removing at least one portion of at least one section of said airfoil to create at least one deficit of material for said airfoil relative to said specified nominal dimensions, said at least one section selected from the group consisting of the leading edge section and the trailing edge section;
   c. providing at least one insert comprising a second material, said second material having at least one of (1) a creep life that is at least about three times greater than said creep life of said first material, and (2) a fatigue life that is at least three times greater than said fatigue life of said first material; and
   d. disposing said at least one insert onto said airfoil such that said at least one deficit of material is substantially eliminated.

2. The method of claim 1, wherein said airfoil comprises a gas turbine component selected from the group consisting of a blade and a vane.

3. The method of claim 1, wherein said first material comprises a superalloy based on a metal selected from the group consisting of cobalt, iron, and nickel.

4. The method of claim 3, wherein said first material comprises a directionally solidified material.

5. The method of claim 3, wherein said first material comprises a single crystal material.

6. The method of claim 1, wherein said second material comprises a superalloy based on a metal selected from the group consisting of cobalt, iron, and nickel.

7. The method of claim 6, wherein said second material comprises a directionally solidified material.

8. The method of claim 6, wherein said second material comprises a single crystal material.

9. The method of claim 6, wherein said second material comprises a platinum-group-metal-modified Ni-based superalloy.

10. The method of claim 1, wherein said second material comprises a directionally solidified eutectic alloy.

11. The method of claim 10, wherein said directionally solidified eutectic alloy comprises Ni, Ta, and C.

12. The method of claim 1, wherein said second material comprises an oxide dispersion strengthened material.

13. The method of claim 12, wherein said oxide dispersion strengthened material comprises Ni, Cr, and yttrium oxide.

14. The method of claim 1, wherein said second material comprises a refractory superalloy.

15. The method of claim 14, wherein said refractory superalloy comprises Rh.

16. The method of claim 1, wherein said insert comprises a metal selected from the group consisting of Rh, Pt, Pd, and mixtures thereof.

17. The method of claim 16, wherein said metal comprises a layer with a thickness in the range from about 0.127 mm to about 0.635 mm.

18. The method of claim 1, wherein said insert further comprises at least one internal cooling channel.

19. The method of claim 1, wherein said insert further comprises a plurality of cooling holes.

20. The method of claim 1, wherein disposing comprises joining said insert to said airfoil.

21. The method of claim 20, wherein joining comprises a process selected from the group consisting of brazing, welding, diffusion bonding, and combinations thereof.

22. An airfoil repaired in accordance with the method of claim 1.

23. A method of repairing an airfoil, comprising:
   a. providing an airfoil having specified nominal dimensions, said airfoil comprising a nickel-based superalloy and further comprising a leading edge section and a trailing edge section;
   b. removing at least one portion of at least one section of said airfoil to create at least one deficit of material for said airfoil relative to said specified nominal dimensions, said at least one section selected from the group consisting of said leading edge section and said trailing edge section;
   c. providing at least one insert comprising a material having at least one of (1) a creep life that is at least about three times greater than a creep life of said nickel-based superalloy, and (2) a fatigue life that is at least three times greater than a fatigue life of said nickel-based superalloy; and
   d. disposing said at least one insert onto said airfoil such that said at least one deficit of material is substantially eliminated.

24. A method for manufacturing a gas turbine airfoil having specified nominal dimensions, a leading edge section, and a trailing edge section, said method comprising:
   a. providing an airfoil having at least one deficit of material relative to at least one specified nominal dimension, said airfoil comprising a first material having a creep life and a fatigue life, said at least one deficit located in at least one section of said airfoil selected from the group consisting of said leading edge section and said trailing edge section;
   b. providing at least one insert comprising a second material, said second material having at least one of (1) a creep life that is at least about three times greater than said creep life of said first material, and (2) a fatigue life that is at least three times greater than said fatigue life of said first material; and
   c. disposing said at least one insert onto said airfoil such that said at least one deficit of material is substantially eliminated.

25. The method of claim 24, wherein said airfoil comprises a gas turbine component selected from the group consisting of a blade and a vane.

26. The method of claim 24, wherein said first material comprises a superalloy based on a metal selected from the group consisting of cobalt, iron, and nickel.

27. The method of claim 26, wherein said first material comprises a directionally solidified material.

28. The method of claim 26, wherein said first material comprises a single crystal material.

29. The method of claim 24, wherein said second material comprises a superalloy based on a metal selected from the group consisting of cobalt, iron, and nickel.

30. The method of claim 29, wherein said second material comprises a directionally solidified material.

31. The method of claim 29, wherein said second material comprises a single crystal material.

32. The method of claim 29, wherein said second material comprises a platinum-group-metal-modified Ni-based superalloy.

33. The method of claim 24, wherein said second material comprises a directionally solidified eutectic alloy.

34. The method of claim 33, wherein said directionally solidified eutectic alloy comprises Ni, Ta, and C.

35. The method of claim 24, wherein said second material comprises an oxide dispersion strengthened material.

36. The method of claim 35, wherein said oxide dispersion strengthened material comprises Ni, Cr, and yttrium oxide.

37. The method of claim 24, wherein said second material comprises a refractory superalloy.

38. The method of claim 37, wherein said refractory superalloy comprises Rh.

39. The method of claim 24, wherein said insert comprises a metal selected from the group consisting of Rh, Pt, Pd, and mixtures thereof.

40. The method of claim 39, wherein said metal comprises a layer with a thickness in the range from about 0.127 mm to about 0.635 mm.

41. The method of claim 24, wherein said insert further comprises at least one internal cooling channel.

42. The method of claim 24, wherein said insert further comprises a plurality of cooling holes.

43. The method of claim 24, wherein disposing comprises joining said insert to said airfoil.

44. The method of claim 43, wherein joining comprises a process selected from the group consisting of brazing, welding, diffusion bonding, and combinations thereof.

45. An airfoil manufactured in accordance with the method of claim 24.

46. A method for manufacturing a gas turbine airfoil having specified nominal dimensions, said airfoil comprising a leading edge section and a trailing edge section, said method comprising:
  a. providing an airfoil having at least one deficit of material relative to at least one specified nominal dimension, said at least one deficit located in at least section of said airfoil selected from the group consisting of the leading edge section and the trailing edge section, said airfoil comprising a nickel-based superalloy;
  b. providing at least one insert comprising a material having at least one of (1) a creep life that is at least about three times greater than a creep life of said nickel-based superalloy, and (2) a fatigue life that is at least three times greater than a fatigue life of said nickel-based superalloy; and
  c. disposing said at least one insert onto said airfoil such that said at least one deficit of material is substantially eliminated.

47. An insert for the manufacture and repair of a gas turbine airfoil, said airfoil comprising a leading edge section and a trailing edge section and having specified nominal dimensions for an airfoil external surface, said insert comprising:
  an external surface that substantially conforms with said specified nominal dimensions for said airfoil external surface at a section of said airfoil selected from the group consisting of said leading edge section and said trailing edge section; and
  a material having at least one of (1) a creep life at about 1100° C. of at least about 150 hours at about 140 MPa, and (2) a fatigue life of at least about 12,000 cycles in axial-axial low cycle fatigue testing, the fatigue testing being performed at about 1100° C. and with a strain range of about 0.25% at about 20 cycles per minute.

48. The insert of claim 47, wherein said insert comprises a superalloy based on a metal selected from the group consisting of cobalt, iron, and nickel.

49. The insert of claim 48, wherein said insert comprises a directionally solidified material.

50. The insert of claim 48, wherein said insert comprises a single crystal material.

51. The insert of claim 48, wherein said second material comprises a platinum-group-metal-modified Ni-based superalloy.

52. The insert of claim 47, wherein said second material comprises a directionally solidified eutectic alloy.

53. The insert of claim 52, wherein said directionally solidified eutectic alloy comprises Ni, Ta, and C.

54. The insert of claim 47, wherein said second material comprises an oxide dispersion strengthened material.

55. The insert of claim 54, wherein said oxide dispersion strengthened material comprises Ni, Cr, and yttrium oxide.

56. The insert of claim 47, wherein said second material comprises a refractory superalloy.

57. The insert of claim 56, wherein said refractory superalloy comprises Rh.

58. The insert of claim 47, wherein said insert comprises a metal selected from the group consisting of Rh, Pt, Pd, and mixtures thereof.

59. The insert of claim 58, wherein said metal comprises a layer with a thickness in the range from about 0.127 mm to about 0.635 mm.

60. The insert of claim 47, further comprising at least one internal cooling channel.

61. The insert of claim 47, further comprising a plurality of cooling holes.

62. An airfoil comprising the insert of claim 47.

63. A gas turbine airfoil, comprising:
  a main body comprising a first material, said first material having a creep life and a fatigue life; and
  at least one insert comprising a second material, said second material having at least one of (1) a creep life that is at least about three times greater than said creep life of said first material, and (2) a fatigue life that is at least three times greater than said fatigue life of said first material, said at least one insert joined to said main body;
  said airfoil comprising a leading edge section and a trailing edge section, wherein said at least one insert comprises at least one portion of at least one section of said airfoil selected from the group consisting of the leading edge section and the trailing edge section.

64. The airfoil of claim 63, wherein said airfoil comprises a gas turbine component selected from the group consisting of a blade and a vane.

65. The airfoil of claim 63, wherein said first material comprises a superalloy based on a metal selected from the group consisting of cobalt, iron, and nickel.

66. The airfoil of claim 65, wherein said first material comprises a directionally solidified material.

67. The airfoil of claim 65, wherein said first material comprises a single crystal material.

68. The airfoil of claim 63, wherein said second material comprises a superalloy based on a metal selected from the group consisting of cobalt, iron, and nickel.

69. The airfoil of claim 68, wherein said second material comprises a directionally solidified material.

70. The airfoil of claim 68, wherein said second material comprises a single crystal material.

71. The airfoil of claim 68, wherein said second material comprises a platinum-group-metal-modified Ni-based superalloy.

72. The airfoil of claim 63, wherein said second material comprises a directionally solidified eutectic alloy.

73. The airfoil of claim 72, wherein said directionally solidified eutectic alloy comprises Ni, Ta, and C.

74. The airfoil of claim 63, wherein said second material comprises an oxide dispersion strengthened material.

75. The airfoil of claim 74, wherein said oxide dispersion strengthened material comprises Ni, Cr, and yttrium oxide.

76. The airfoil of claim 63, wherein said second material comprises a refractory superalloy.

77. The airfoil of claim 76, wherein said refractory superalloy comprises Rh.

78. The airfoil of claim 63, wherein said insert comprises a metal selected from the group consisting of Rh, Pt, Pd, and mixtures thereof.

79. The airfoil of claim 78, wherein said metal comprises a layer with a thickness in the range from about 0.127 mm to about 0.635 mm.

80. The airfoil of claim 63, further comprising at least one internal cooling channel.

81. The airfoil of claim 63, wherein said insert further comprises a plurality of cooling holes.

82. The airfoil of claim 63, wherein said insert is joined to said main body by a process selected from the group consisting of brazing, welding, diffusion bonding, and combinations thereof.

83. A gas turbine airfoil, comprising:

a main body comprising a nickel-based superalloy; and at least one insert, said at least one insert comprising a material having at least one of (1) a creep life that is at least about three times greater than a creep life of said nickel-based superalloy, and (2) a fatigue life that is at least three times greater than a fatigue life of said nickel-based superalloy; said airfoil comprising a leading edge section and a trailing edge section, wherein said at least one insert comprises at least one portion of at least one section of said airfoil selected from the group consisting of the leading edge section and the trailing edge section.

* * * * *